June 22, 1965 — L. BEAUJARD ETAL — 3,190,112
ULTRASONIC INSPECTION PROBE
Filed Jan. 23, 1962 — 2 Sheets-Sheet 1

INVENTORS
LOUIS BEAUJARD
JACQUES MONDOT
BY Kurt Kelman

June 22, 1965  L. BEAUJARD ETAL  3,190,112
ULTRASONIC INSPECTION PROBE
Filed Jan. 23, 1962  2 Sheets-Sheet 2
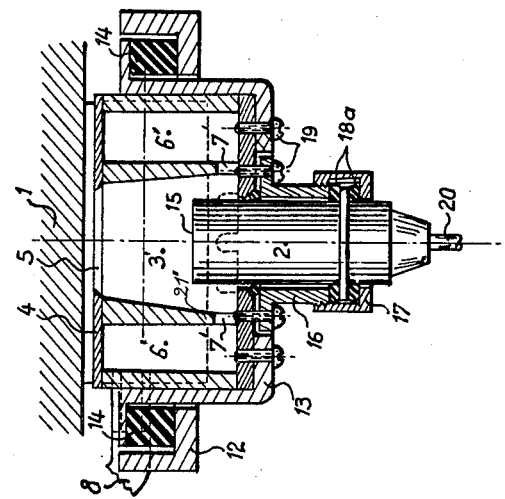
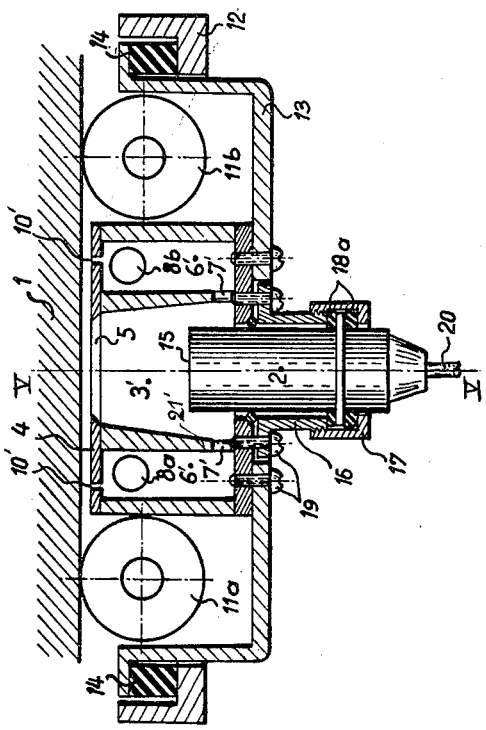
INVENTORS,
LOUIS BEAUJARD
JACQUES MONDOT
BY Kurt Kelman

United States Patent Office 3,190,112
Patented June 22, 1965

3,190,112
ULTRASONIC INSPECTION PROBE
Louis Beaujard and Jacques Mondot, Saint Germain-en-Laye, France, assignors to Institut de Recherches de la Siderurgie Francaise, Saint Germain-en-Laye, France, a professional institution of France
Filed Jan. 23, 1962, Ser. No. 168,086
Claims priority, application France, June 6, 1961, 864,011, Patent 1,299,006
10 Claims. (Cl. 73—71.5)

This invention relates to an ultrasonic inspection system, and more particularly to an improved searching unit in such systems.

Systems for the inspection and acceptance-testing of materials by ultrasonic waves are now used to a considerable extent. A number of devices and arrangements for operating such systems are already known. In particular, a number of devices have been proposed for solving the delicate problem of acoustically coupling the usually employed electro-mechanical transducer and the material being tested. None of the existing devices, some of which, for instance, have recourse to a film or sheet of plastic placed between the transducer and the test piece, over which the transducer slides, has been found to give entire satisfaction in cases where it is required to explore a test piece with a rough surface, or when either the transducer or the test piece are in a state of rapid motion. Actually, the known devices of this kind present a number of drawbacks, such as, a rapid and prohibitive rate of wear of the transducer and the risk of its instantaneous destruction by contact with an unseen protuberance on the test piece; the extreme irregularity of the acoustic coupling between the suupersonic transducer and the test piece and fluctuations of the angle of penetration of the beam of ultrasonic waves.

The present invention has as its principal object an ultrasonic searching unit which obviates or mitigates the above disadvantages and enables the testing of pieces in a state of rapid motion relative to the transducer to be performed without causing wear of the latter and without risk of disturbance of the acoustic coupling between them.

In the ultrasonic inspection system of this invention, the searching unit is coupled to the test piece by a liquid couplant, preferably water. The searching unit comprises an end plate conforming in shape, and being parallel, to the surface of the test piece and having an opening for the passage of the ultrasonic beam emitted by an electro-mechanical transducer mounted in the unit in alignment with the opening. The searching unit has a container and the end plate constitutes one wall of the container, a liquid couplant inlet means being connected to another wall of the container and a baffle member within the container dividuing its interior into two chambers. The first chamber adjoins the inlet means and serves as a flow smoothing or surge chamber for the inflowing liquid couplant. The second chamber adjoins the end plate and serves as a steady-flow chamber. A liquid conduit means in the baffle member connects the chambers and the transducer terminates in the steady-flow chamber. Gas bubbles entrained by the in-flowing liquid couplant are separated therefrom in the surge chamber before its entry into the steady-flow chamber and at least one port means in its upper part provides an outlet for the discharge of the gas bubbles. A means, such as rollers, glidingly supports the unit on the test piece surface and the distance between the plate and the test piece surface is so small and the flow section of the conduit means between the two chambers is sufficiently large to localize the flow resistance of the liquid at the interface between the plate and the test piece. The liquid forms a thin film of large surface area in the channel between the plate and the test piece surface in which the liquid flows radially outwardly with a high pressure gradient along the flow lines.

The ultrasonic searching unit may include a frame which, due to the inter-position of elastic buffers or shock absorbers, mounts the container with some rotary and translatory freedom of movement.

A searching unit of this structure introduces considerable improvements in ultrasonic inspection systems for test pieces the surface whereof is either rough or irregular, in particular, products of the iron and steel industry. Such test pieces present a difficult problem with regard to the provision of sufficient acoustic coupling between the transducer, which is usually of the electro-mechanical type, and the surface of the test piece. In order to obviate the necessity for direct contact between the transducer and the test piece with consequent risk of wear and abrasion, or actual fracture by impact which might result, a liquid layer is introduced between the two elements, simultaneously ensuring and obtaining good acoustic coupling. In actual fact, no good coupling can be obtained between the smooth surface of a transducer and a rough or irregular surface on a test piece. The most convenient remedy is to interpose a continuous flow of water, so as to create a permanent column of liquid between the transducer and the test piece. However, it is necessary to avoid as far as possible the formation of any eddies, whereby air bubbles might be induced to cross the track of the ultrasonic beam. For this reason, the water is first supplied to a "smoothing or surge" chamber, in which eddies are damped out and suppressed, and from which any trapped air bubbles can escape at the top, in the presence of a low flow velocity (through the chamber). This surge chamber communicates, preferably by a bottom conduit of ample size, with a "steady-flow" chamber into which the sensitive tip of the transducer is immersed. Opposite the tranducer head is the opening through which the ultrasonic beam issues, and the discharge of the water flows. Since the gap left between the searching unit and the test piece is very narrow, the water issues in a radial flow all around the aforesaid opening, with a high speed and high pressure gradient and forms a continuous film of extensive area and very small flow section which prevents any trapped air bubbles from being carried between the searching unit and the test piece, even if these are moving very rapidly relatively to each other.

It is thus clear that it is possible by such means to obtain an acoustic coupling entirely free from disturbance, by eliminating trapped air bubbles from the water and "smoothing" the flow by passage through a succession of enlarged chambers or spaces, separated by baffles. Both to prevent the development of turbulence (eddy-formation) in the flow and to eliminate the risk of trapped air bubbles entering between the transducer and the test piece, it is essential for the major loss of pressure in the flow to take place between the test piece surface and the adjacent wall of the searching unit.

Two embodiments of the present invention will now be described, by way of example, with reference to the accompanying drawing, in which:

FIG. 4 is a sectional elevational view of a similar searching unit for testing substantially horizontal surfaces from below; and FIG. 5 is a section on line V—V of FIG. 4.

Figure 3:
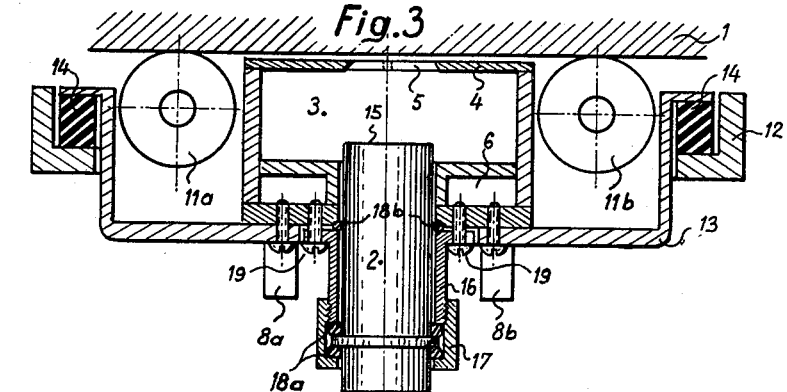
FIG. 3 is a section on line III—III of FIG. 1.
Figure 1:
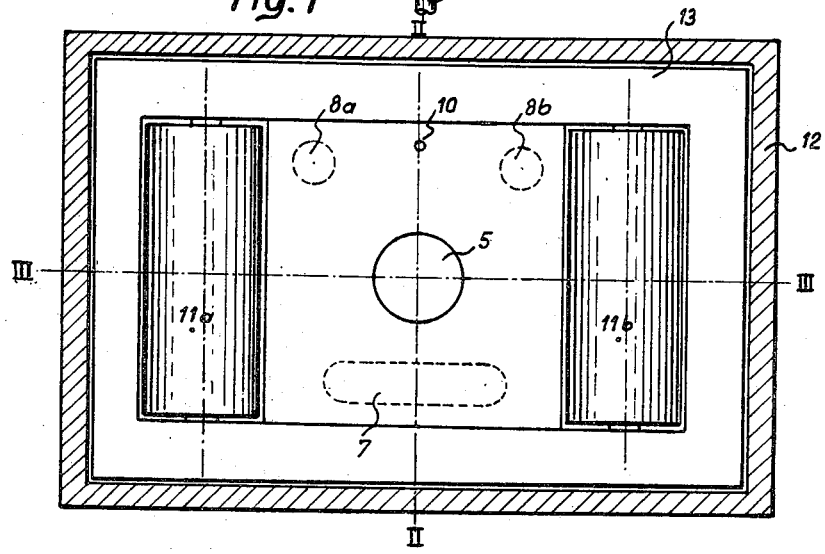
FIG. 1 is a front elevational view of a searching unit for vertical or sloping surfaces.
Figure 2:
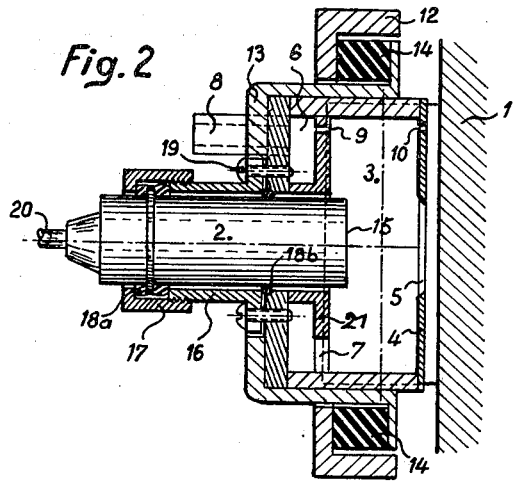
FIG. 2 is a section on line II—II of FIG. 1.

Referring first to the searching unit of FIGS. 1–3, its conventional electro-mechanical transducer 2 projects an ultrasonic beam into the test piece 1 through an intermediate, water-filled container 3 defining a "steady-flow" chamber. The chamber 3 is closed by a plate 4 having a central opening 5 for the axial passage of the ultrasonic beam emitted by the transducer which is aligned with the axis of the opening 5. The energy reflected by the test piece returns to the transducer through the opening. The chamber 3 is supplied with the liquid couplant from a compartment 6, defining a "smoothing or surge" chamber which communicates with the steady-flow chamber 3 by means of a wide port 7 leading to the lower part of the steady-flow chamber through the baffle member 21. The upper part of the smoothing or surge chamber 6 is supplied with water by two pipes 8a, 8b. The two chambers 3 and 6 further intercommunicate through a small bore 9 of narrow cross-section, connecting their upper parts. The plate 4 is pierced by a small hole 10, opposite to the bore 9.

This searching unit assembly is supported on two rollers 11a, 11b which run on the surface of the test piece 1 and maintain a small and constant gap of only a few tenths of a millimeter between the aforesaid surface and the plate 4. This assembly is mounted in a frame 12 by means of a yoke 13 and elastic rubber buffers 14 which impart to it the degrees of axial resiliency necessary to enable the rollers 11a, 11b to remain continually in contact with the test piece 1 but do not allow of any lateral displacement of the assembly.

The water enters through the pipes 8a, 8b into the smoothing or surge chamber 6, where its flow is allowed to become smooth, the flow velocity is diminished and any air bubbles trapped in the water are enabled to rise to the top of this chamber before the chamber 3 becomes filled. The water in the chamber 3 is thus free from turbulence (eddies) and air bubbles, spreading through, and radially around, the central opening 5 to act as a couplant between the plate 4 and the test piece 1. The air bubbles collecting at the top of the chamber 6 are discharged through the holes 9 and 10 without being in the path of the ultrasonic beam. The flow sections of the inlet pipes 8, the chambers 3 and 6 and the ports 7 and 5 are so adjusted that nearly the whole pressure drop is localized in the liquid film between the plate 4 and the test piece 1, so that a steep, radial pressure gradient, of the order of 0.2 kg./cm.$^2$/cm. exists in this liquid film, which prevents any air bubbles trapped by the relative motion of the searching unit and the test piece from reaching the path of the ultrasonic beam and interfering with the measurement. Similarly, the air bubbles trapped in the water and collecting at the top of the chamber 6 escape through the holes 9 and 10 and are carried radially outside by the film of water before being able to reach the opening 5.

The electro-mechanical transducer 2 is inserted in the steady-flow chamber with its scanning face 15 immersed in the flowing water which acts as the acoustic couplant with the test piece 1. The transducer is held in a socket 16 by a nut 17 with fibre packing rings 18a which effect the sealing of the chamber. The nut is threadedly mounted on the socket to make it possible to adjust the spacing between the transducer 2 and the test piece 1. The socket 16, the yoke 13 and the searching unit itself are held together by screws 19, which simultaneously serve to regulate the angular setting of the transducer (angle of incidence of the ultrasonic beam) with the help of the rubber backing ring 18b.

In the illustrated embodiment, the metal test pieces to be scanned are of considerable length and are moved in relation to the transducer. The frame 12 carrying the searching unit is arranged to swivel and swing aside in order to enable the positioning and removal of the searching unit in relation to the work to be inspected. Obviously, this arrangement can be reversed and the searching unit may be moved along the test piece without thereby affecting the principle of the invention.

The transducer 2 is connected by a coaxial cable 20 to any suitable ultrasonic flaw detection instrument which does not form part of the present invention.

FIGS. 4 and 5 show a device of the same kind for scanning the horizontal underside of a test piece. Identical elements are designated by identical reference numerals as in the embodiments of FIGS. 1–3 and will not be described again. The manner of operation of this searching unit is exactly the same but the relative arrangement of the flow chambers, water inlets and the various ports and openings is modified. In particular, an annular smoothing or surge chamber 6' completely surrounds the steady-flow chamber 3', with which it communicates by a number of ports 7', the annular baffle member 21' dividing the container into the chambers 3' and 6'. The air bubbles collect in the upper part of the chamber 6', as in the preceding embodiment, and escape to the outside through the small holes 10', being carried away by the liquid film without reaching the central opening 5.

The searching units described above have been operated in a steelworks for the inspection of steel billets before they enter an automatic, continuous wire mill. It has been found possible to handle 1500 tons of billets, passing in front of a single searching unit at a rate of 2 meters per second, in one working day, an accurate performance of such speed has been unattainable by any other existing form of ultrasonic searching units. Even much higher working speeds will be possible, according to present indications.

While the invention has been particularly described in conjunction with certain now preferred embodiments, it will be clearly understood that many modifications and variations may occur to the skilled in the art without departing from the spirit and scope of the present invention as defined by the appended claims.

What is claimed is:
1. In an ultrasonic device for inspecting a test piece having a surface, in combination:
   (a) a container defining a chamber therein, said container including a n end plate formed with an opening, said opening having an axis;
   (b) a baffle member in said container and dividing said chamber into two portions, one of said portions contiguously communicating with said opening;
   (c) transducer means in said one chamber portion, said transducer means being axially aligned with said opening for emitting an ultrasonic beam from said chamber portion outward through said opening;
   (d) supply means for continuously supplying a coupling liquid to the other portion of said chamber,
      (1) a portion of said container and said baffle member constituting the wall of said other chamber portion,
      (2) said wall being formed with port means for selective release of gas from said other chamber portion when the same contains said gas and a liquid, and
      a conduit connecting said chamber portions for flow of said coupling liquid from said supply means in sequence through said other chamber portion, said conduit, said one chamber portion, and said opening; and
   (e) support means for supporting said container on said test piece surface in a position in which said end plate is spaced a predetermined distance from said surface, and said end plate and said surface define a flow channel therebetween, said flow channel leading radially away from said opening and having an effective flow section substantially smaller than the flow section of said chamber portions, of said conduit, and of said opening, whereby the pressure drop in the flowing coupling liquid is concentrated in said channel.
2. The device of claim 1, wherein said port means are upwardly spaced from said conduit in the normal operating position of said device.

3. The device of claim 1, wherein said supply means include a supply pipe communicating with said other chamber portion, the flow section of said pipe being substantially smaller than the flow section of said other chamber portion.

4. The device of claim 1, wherein the flow section of said conduit is substantially smaller than the respective flow sections of said chamber portions.

5. The device of claim 1, wherein said distance between the end plate and the test piece surface is of the order of a few tenths of a millimeter.

6. The device of claim 3, wherein said supply pipe communicates with an upper part of said other chamber portion in the normal operating position of said device and said conduit connects respective lower parts of said chamber portions.

7. The device of claim 1, wherein said support means include rollers adapted to engage the test piece surface in rolling contact.

8. The device of claim 1, further comprising a carrying frame, said support means being mounted on said frame, frame said support means being mounted on said frame, and an elastic buffer means interposed between said carrying frame and said container.

9. In an ultrasonic device for inspecting a test piece having a surface, in combination:
 (a) wall means defining a steady flow chamber, a surge chamber, and a conduit connecting said chambers, said wall means including an end plate formed with an outward opening having an axis, said opening communicating with said steady flow chamber;
 (b) transducer means in said steady flow chamber, said transducer means being aligned with said opening for emitting an ultrasonic beam from said steady flow chamber outward through said opening;
 (c) supply means for continuously supplying a coupling liquid to said surge chamber for sequential flow of said liquid through said conduit, said steady flow chamber, and said opening;
 (d) port means for releasing gas from the coupling liquid in said surge chamber; and
 (e) support means for supporting said end plate on said test piece surface in a position in which said end plate is spaced a predetermined distance from said surface, and said end plate and said surface define a flow channel therebetween, said flow channel leading radially away from said opening and having an effective flow section substantially smaller than the flow sections of said chambers and of said conduit, whereby the pressure drop in the flowing coupling liquid is concentrated in said channel.

10. In a device as set forth in claim 9, said transducer means including an electromechanical transducer.

References Cited by the Examiner

UNITED STATES PATENTS

| 2,751,783 | 6/56 | Erdman | 73—67.8 |
| 2,873,391 | 2/59 | Schulze | 73—67.9 |
| 3,028,753 | 4/62 | Joy | 73—67.8 |
| 3,050,988 | 8/62 | Gordon et al. | 73—67.5 |

OTHER REFERENCES

Pages 60 and 61, The Iron Age Magazine, issue of June 8, 1944, an article titled "Sheet Fractures Detected with Supersonics."

RICHARD C. QUEISSER, *Primary Examiner.*
ROBERT L. EVANS, *Examiner.*